United States Patent [19]

Mori et al.

[11] Patent Number: 4,627,316

[45] Date of Patent: * Dec. 9, 1986

[54] AUTOMATIC SCREWDRIVER

[75] Inventors: Takashi Mori, Koriyama; Kouichi Mizu, Hirakata; Yasunori Jo, Osaka, all of Japan

[73] Assignee: Matsushita Electric Industrial Co., Ltd., Japan

[*] Notice: The portion of the term of this patent subsequent to Jan. 29, 2002 has been disclaimed.

[21] Appl. No.: 688,828

[22] Filed: Jan. 2, 1985

Related U.S. Application Data

[63] Continuation of Ser. No. 370,194, Apr. 21, 1982, Pat. No. 4,495,841.

[51] Int. Cl.$^4$ ............................................. B25B 23/06
[52] U.S. Cl. ........................................ 81/430; 81/57.37; 81/435; 227/117
[58] Field of Search .............. 81/57.37, 430, 435; 227/117–119, 41, 49, 148, 112; 221/290

[56] References Cited

U.S. PATENT DOCUMENTS

| | | | |
|---|---|---|---|
| 2,544,165 | 3/1951 | Krasnow | 81/430 |
| 3,438,411 | 4/1969 | Rech | 81/430 |
| 3,583,451 | 6/1971 | Dixon et al. | 81/57.37 |
| 4,392,300 | 7/1983 | Billman et al. | 227/112 X |

FOREIGN PATENT DOCUMENTS

| | | | |
|---|---|---|---|
| 2647971 | 7/1971 | Japan | 81/57.37 |
| 48-40877 | 12/1973 | Japan | |
| 51-14758 | 5/1976 | Japan | |
| 51-15638 | 5/1976 | Japan | |

Primary Examiner—Frederick R. Schmidt
Assistant Examiner—Debra S. Meislin
Attorney, Agent, or Firm—Lowe, Price, LeBlanc, Becker & Shur

[57] ABSTRACT

An automatic screwdriver for driving a screw in a horizontal direction comprises a chute for supplying screws with their shanks hanging down, a gate for allowing the screws to be discharged one at a time out of the chute, an index mechanism for carrying a screw discharged from the chute along an angular interval to a catcher disposed in front of a screwdriver bit unit. The index mechanism has a carrier arm angularly movable between a first position in which it receives the screw from the chute and a second position in which the screw is transferred from carrier arm onto the catcher. The screwdriver bit unit comprises a suction pipe for drawing the screw therein from the catcher and a screwdriver bit rotatably disposed in the suction pipe and axially movable for driving the screw into a workpiece. The automatic screwdriver is driven by a pneumatic control system for actuating the gate, the index mechanism, and the screwdriver bit unit.

9 Claims, 10 Drawing Figures

AUTOMATIC SCREWDRIVER

This is a continuation of application Ser. No. 370,194, filed Apr. 21, 1982, now U.S. Pat. No. 4,495,841.

BACKGROUND OF THE INVENTION

The present invention relates to an automatic power-driven screwdriver for tightening screws in a horizontal direction, and more particularly to an automatic screw tightening machine having a chute for feeding screws with their shanks hanging down and an index mechanism for orienting the screws in a horizontal direction before they are advanced and tightened by a screwdriver bit.

Various automatic screwdrivers have been used for tightening screws one by one in a horizontal direction. One form of such horizontal screw tightening machine comprises a chute for supplying screws arranged in a row, a tube for feeding the screws under pneumatic pressure one by one from the chute into a Y-shaped pipe, a pair of pivoted jaws mounted on the Y-shaped pipe for gripping one of the screws at a time, and a screwdriver bit reciprocably mounted in the Y-shaped pipe for driving the screw into a workpiece after the Y-shaped pipe has been advanced toward the workpiece. The tube for pneumatically forcing the screws into the Y-shaped pipe has a bore which is only slightly larger in diameter than the heads of the screws to be fed therethrough so that the screws can effectively be propelled without substantial air leakage past the screw heads. Therefore, the known screw tightening machine lacks versatility as it cannot tighten those screws which have head diameters that do not fit the tube bore.

Another prior horizontal screwdriver includes a chute on which screws are vertically supported in a horizontal row. A suction pipe draws screws one by one from the chute under a vacuum into the suction pipe, and a screwdriver bit concentrically disposed in the suction pipe for tightening the screws. The suction tube and screwdriver bit are reciprocably movable between a vertical position in which a screw is introduced into the suction tube and a horizontal position in which the screw is driven by the screwdriver bit out of the suction pipe into a workpiece. The screw tightening machine, with a mechanism required for moving the suction tube and screwdriver bit, is relatively large in size and complicated in structure, and one cycle of operation of the machine requires a relatively long period of time for each screw to be applied.

SUMMARY OF THE INVENTION

It is an object of the present invention to provide an automatic screwdriver capable of tightening screws having different head diameters and/or shanks of varying lengths.

Another object of the present invention is to provide an automatic screwdriver for driving screws in a horizontal direction, the screwdriver having a relatively simple and small index mechanism for feeding screws one at a time from a chute to a horizontal position in which the screw is ready to be driven by a screwdriver bit into a workpiece.

According to the present invention, an automatic screwdriver for driving screws one by one into a workpiece in a horizontal sense includes a chute for supplying the screws arranged in a row with shanks hanging down, a gate mounted on the chute for allowing the screws to be discharged one at a time out of the chute, an index mechanism for carrying one screw at a time supplied from the chute through an angular interval to a catcher unit disposed in front of a screwdriver unit. The screwdriver unit has a horizontal suction pipe for drawing the screw therein from the catcher unit and a screwdriver bit mounted for rotation in the suction pipe, the screwdriver bit being axially reciprocably movable to advance the screw past the catcher unit for driving the screw into a workpiece. The index mechanism has a carrier arm that is angularly movable between a first position in which the carrier arm receives a screw from the chute and a second position in which the screw is transferred onto the catcher unit. The gate, the index mechanism, and the screwdriver unit are actuatable by a pneumatic control system.

The above and other objects, features, and advantages of the present invention will become more apparent from the following description when taken in conjunction with the accompanying drawings in which a preferred embodiment of the present invention is shown by way of illustrative example.

BRIEF DESCRIPTION OF THE DRAWINGS

FIG. 11 is an exploded perspective view of a base supporting a catcher, pivotal levers and screw head guides aligning a screw received from a carrier arm with a suction tube and screwdriver bit unit.

BRIEF DESCRIPTION OF THE PREFERRED EMBODIMENT

Figure 1:
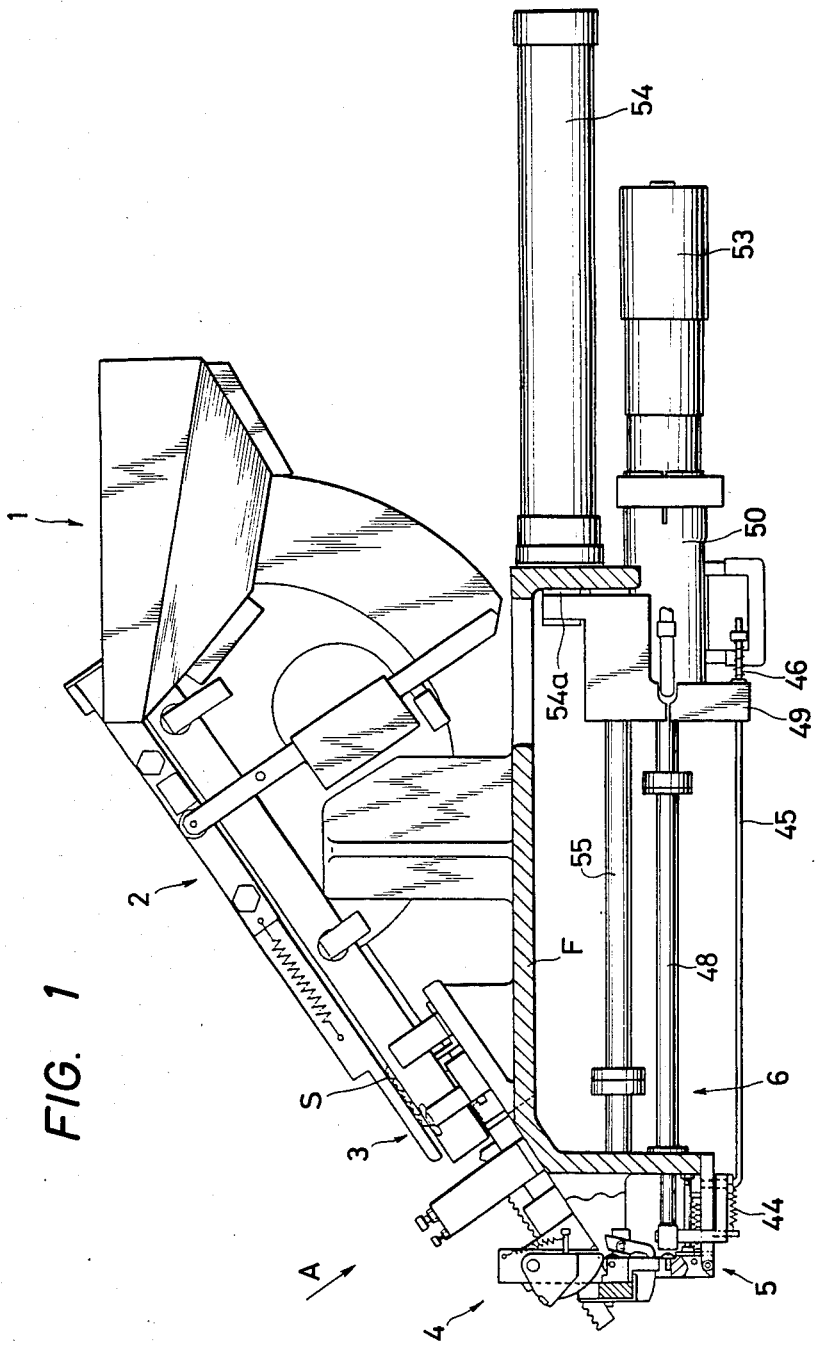
FIG. 1 is a front elevational view of a automatic screwdriver according to the present invention.

As shown in FIG. 1, an automatic screwdriver basically comprises a hopper 1 for containing screws S, a slanted chute 2 for supplying the screws by gravity, which are arranged in a row with their shanks hanging down, a gate 3 for discharging the screws one at a time out of the chute 2, an index mechanism 4 for carrying one screw at a time from the chute 2 along an angular interval down to a catcher unit 5 in which the screw is oriented in a horizontal direction, and a screwdriver bit unit 6 for drawing the screw therein and driving the screw into a workpiece.

Figure 3:
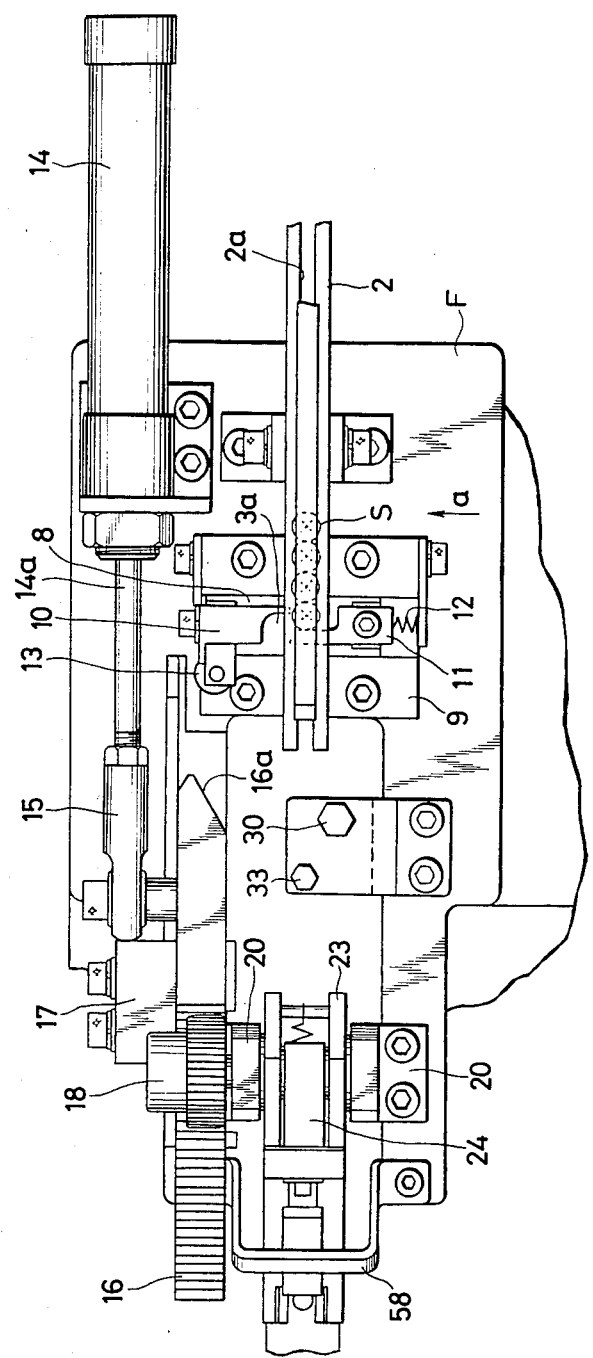
FIG. 3 is a plan view of the automatic screwdriver as viewed in the direction of arrow A in FIG. 1.
Figure 7:
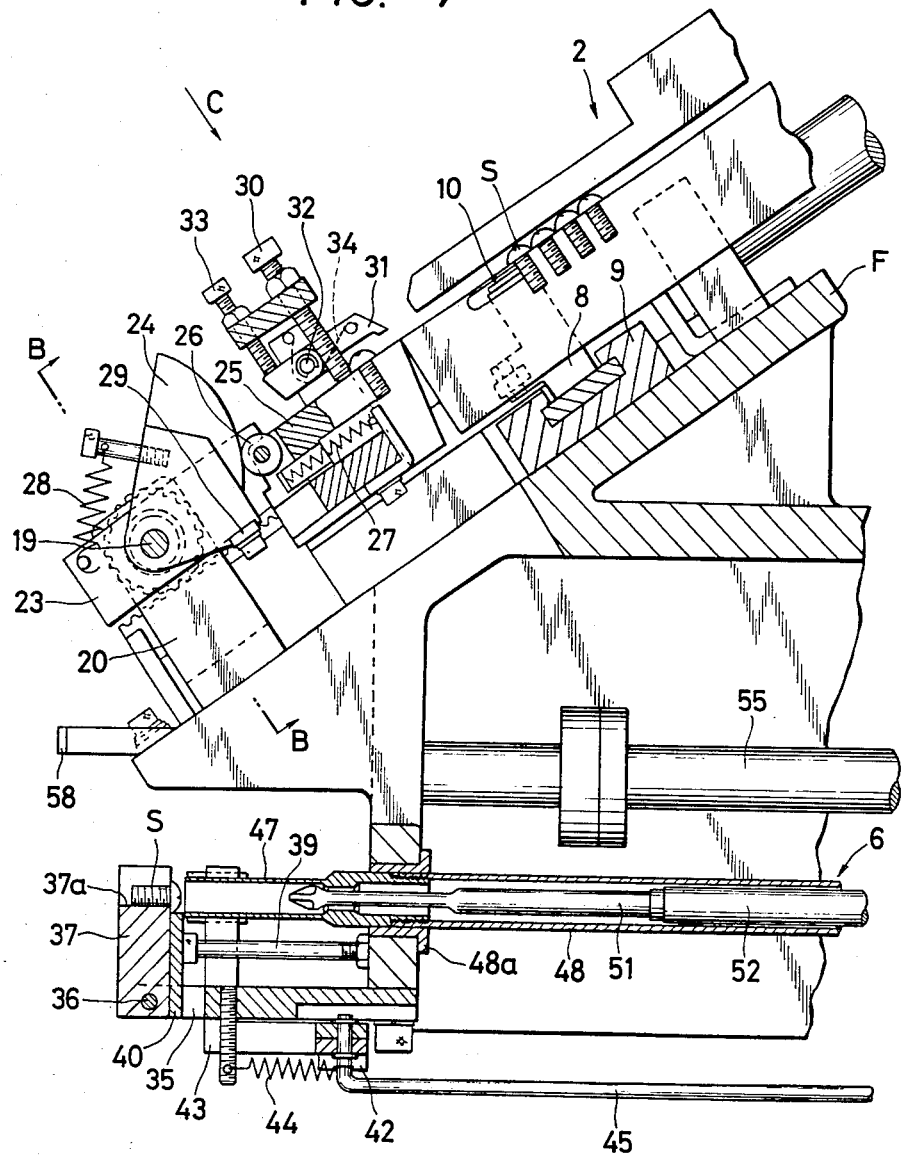
Figure 9:
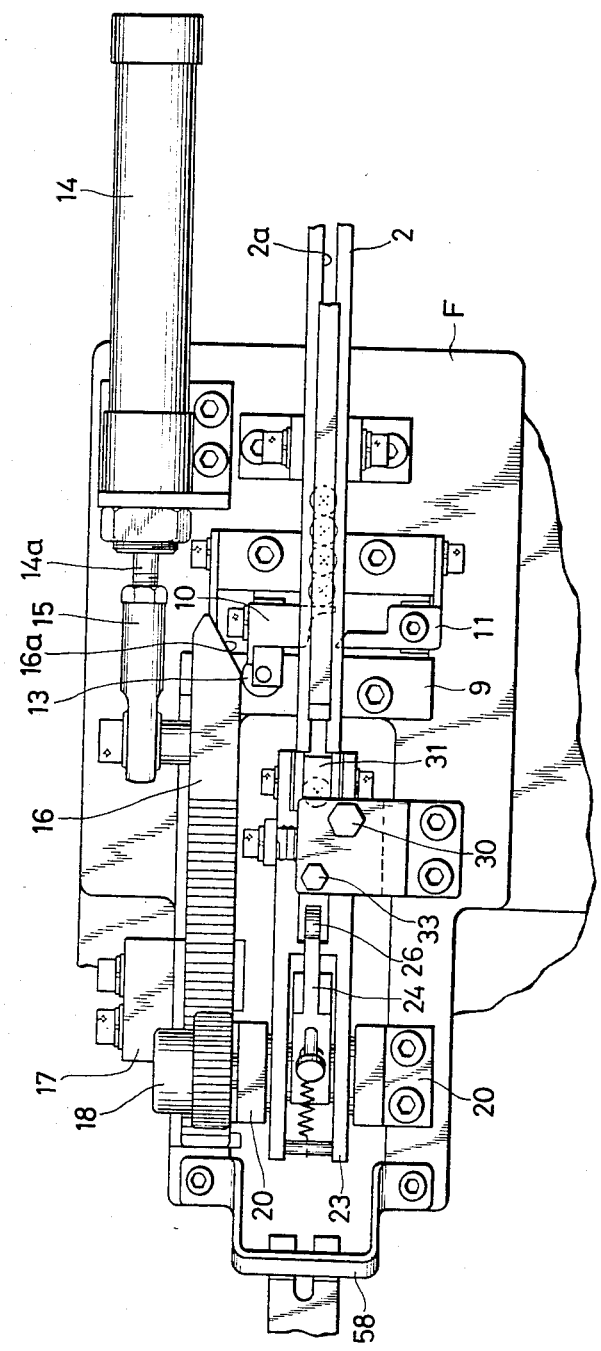
FIG. 9 is a plan view of the automatic screwdriver as viewed in the direction of the arrow C in FIG. 7.

In FIG. 3, the chute 2 is mounted on a frame F of the screwdriver and has a groove 2a extending therealong for receiving a row of screws S. As shown in FIGS. 3 and 7, the gate 3 includes a base 9 mounted on the frame F and an escape slide 8 slidably disposed in the base 9 and movable transversely of the chute 2. The escape slide 8 has a pair of fingers 10, 11 screwed thereto and jointly defining a curved slot 3a extending transversely of the groove 2a of the chute 2. The curved slot 3a is dimensioned such that it will allow one of the screws at a time to pass therethrough while moving along the groove 2a when the escape slide 8 slides. The escape slide 8 is normally urged by a spring 12 to move in the direction of the arrow a (FIG. 3) to close the gate 3. The escape slide 8 has a roller cam follower 13 supported adjacent to the finger 10 for being engaged by a cam surface 16a of a rack 16, which will be described below.

A single acting air cylinder 14 is mounted on the frame F and has a piston rod 14a which is connected through a connector 15 to rack 16. Actuation of the air cylinder 14 to draw in the piston rod 14a causes the cam surface 16a to engage the roller cam follower 13 for sliding the escape slide 8 to open the gate 3. Extending movement of the piston rod 14a is limited by a stopper 17 mounted on the frame F when the connector 15 abuts against the stopper 17. The rack 16 is held in driving mesh with a pinion 18 secured to a shaft 19 which is rotatably journalled by bearings 21, 21 (FIG. 8) in a pair of support brackets 20, 20 disposed on the frame F.

Figure 8:
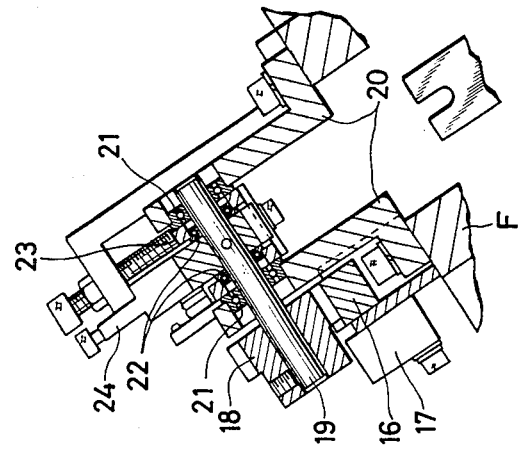
FIG. 8 is a cross-sectional view taken along line B—B of FIG. 7.

The index mechanism 4 includes a carrier arm 23, as shown in FIGS. 3 through 9, which is rotatably supported on the shaft 19 by a pair of bearings 22, 22 (FIG. 8). A plate cam 24 which has an arcuate cam surface 24a is affixed to the shaft 19. A pusher block 25 is movably mounted on the carrier arm 23 and has a roller cam follower 26 that is normally held in abutting engagement with the arcuate cam surface 24a under the resiliency of a compression spring 27 acting between the carrier arm 23 and the pusher block 25. The plate cam 24 has a stop 29 against which a lower edge of the carrier arm 23 is normally held by tension spring 28 acting between the plate cam 24 and the carrier arm 23, as illustrated in FIG. 7. Therefore, the carrier arm 23 is resiliently urged into abutment against the stop 29 of the plate cam 24 for corotation therewith around the shaft 19. A stop bar 30 is mounted on the frame F for stopping the carrier arm 23 in its angular movement at its upper position (FIG. 7) in which a screw S which has passed through the gate 3 can be supplied to the carrier arm 23 and received by the pusher block 25. The carrier arm 23 supports thereon a screw holder 31 pivotably mounted on a pivot pin 32 and biased by a torsion spring 34 to hold the screw S down against the pusher block 25. A holder lifter 33 is mounted on the frame F adjacent to the stop bar 30 for engagement with a rear end of the screw holder 31 to raise the latter away from the pusher block 25 when the carrier arm 23 is in the upper position illustrated in FIG. 7. Thus, in this upper position, the screw S can be transferred from the chute 2 onto the pusher block 25 with the screw holder 31 out of the way.

Figure 4:
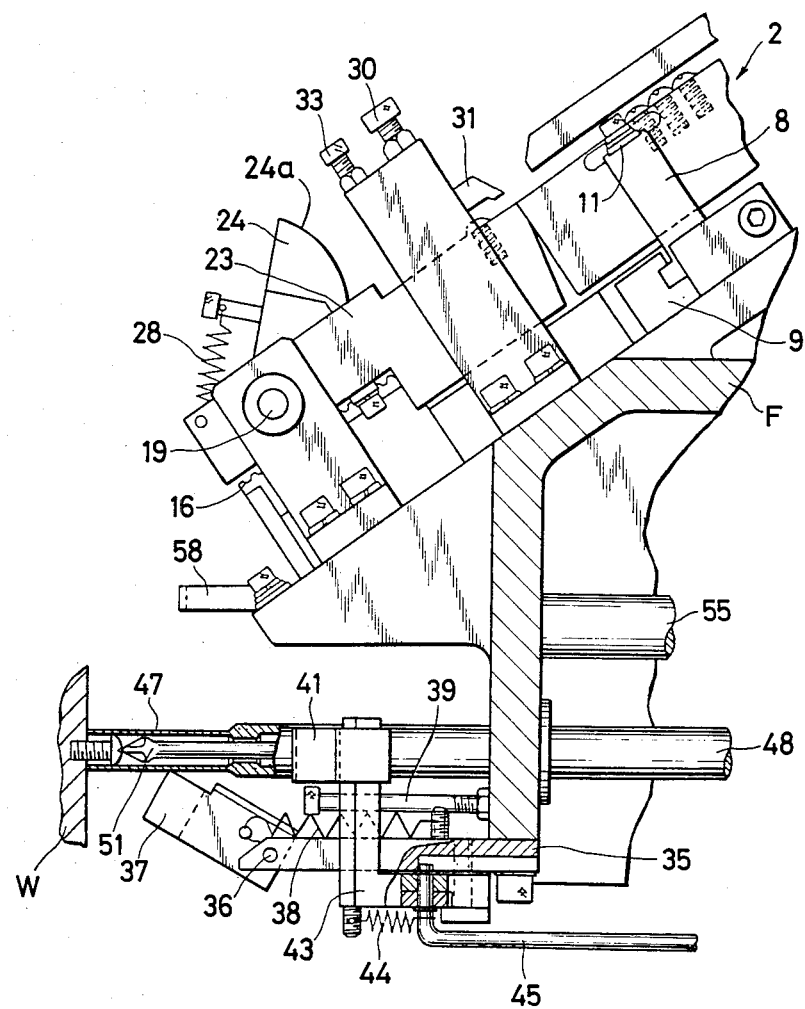
FIGS. 4 through 7 are fragmentary cross-sectional views of the automatic screwdriver.
Figure 5:
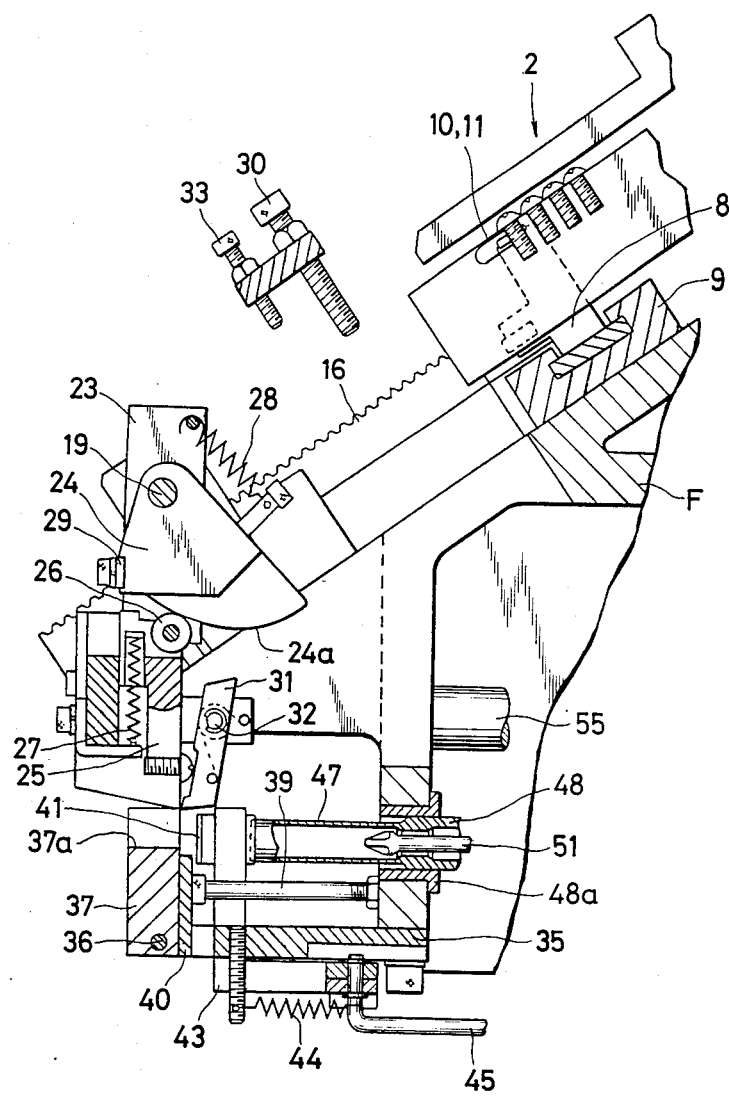

The catcher unit 5 comprises a base 35 mounted on the frame F and a catcher 37 pivotably supported by a pivot pin 36 on the base 35. The catcher 37 is normally urged by a tension spring 38 (FIG. 4) in a direction to turn clockwise into abutting engagement with a stopper rod 39. The catcher 37 has a recess 37a (FIGS. 5 and 7) opening upwardly and receptive of a screw S horizontally in a position which is horizontally aligned with the screwdriver bit unit 6. The catcher 37 also has a plate 40 fixed thereto for supporting the head of the screw S retained in the recess 37a. A stop 58 (FIG. 7) is mounted on the frame F for stopping the carrier arm 23 in its angular movement at its lower position (FIG. 5) in which a screw S can be transferred from the pusher block 25 into the recess 37a in the catcher 37. Thus, the carrier arm 23 is angularly movable about the shaft 19 between the upper position as shown in FIG. 7 and the lower position as shown in FIG. 5.

Figure 2:
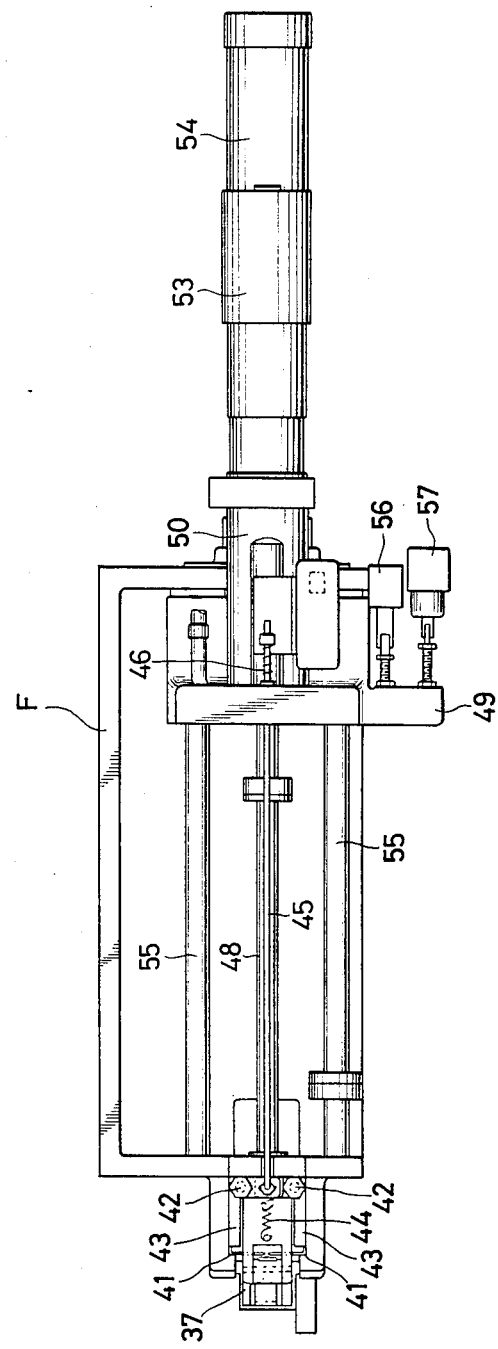
FIG. 2 is a bottom view of the automatic screwdriver shown in FIG. 1.

As illustrated in FIG. 2, a pair of screw head guides 41, 41 are mounted respectively on a pair of pivotable levers 43, 43 which are angularly movable about a pair of pins 42, 42, respectively, mounted on the base 35. The levers 43, 43 are operatively coupled to a rod 45 which is normally urged to the left as shown in FIG. 2 in a direction to separate the screw head guides 41, 41 away from each other. The rod 45 is also urged by a compression spring 46 to move in the opposite direction to bring the screw head guides 41, 41 toward each other, the compression spring 46 acting between the rod 45 and a slide 49 which is slidable along a slide rod 55. When the slide 49 is in its starting position or leftmost position as shown in FIGS. 1 and 2, the forces of the springs 44, 46 acting on the rod 45 are in equilibrium or a state of balance, keeping the screw head guides 41, 41 put together or closed.

The screwdriver bit unit 6 includes a suction pipe 47 threaded coaxially into a vacuum pipe 48 slidably extending through a guide bushing 48a mounted in the frame F, as shown in FIG. 7. The vacuum pipe 48 is axially slidable in an outer cylinder 50 supported on the slide 49. A screwdriver bit 51 is threadedly affixed to a bit holder 52 in coaxial relation, which is rotatably disposed in the vacuum pipe 47. The bit holder 52 is coupled to an actuator 53 mounted on the outer cylinder 50 so as to be driven by the actuator 53 for advancing and rotating the screwdriver bit 51 in the suction pipe 47. The suction pipe 47 is coupled to a vacuum-generating device (described later) to develop a vacuum therein for drawing a screw S from the catcher 37 into the suction pipe 47.

An air cylinder 54 is mounted on the frame F, as illustrated in FIG. 1, and has a piston rod 54a which is secured to the slide 49 for moving the latter slidably along the rod 55. A pneumatic directional control valve 56 and a microswitch 57 are mounted on the frame F, as shown in FIG. 2, and are actuatable by the slide 49 when it returns to the position of FIG. 2.

The automatic screwdriver thus constructed will operate as follows: When a starting signal is supplied, the air cylinder 54 is actuated to move the slide 49 slidably along the rod 55 to the left as shown in FIG. 1, whereupon the valve 56 is turned off to stop pressurization of the single acting cylinder 14. The rack 16 is allowed to return with the piston rod 14a, and the shaft 19 is caused to rotate to bring the plate cam 24 and the carrier arm 23 angularly upwardly until the carrier arm 23 is held in abutment against the stop rod 30 at the upper position shown in FIG. 7. At this position, the screw holder 31 is lifted by the holder lifter 33 away from the carrier arm 23. Contracting movement of the piston rod 14a causes the cam surface 16a to engage the roller cam follower 13 and to move the slide 8 transversely of the chute 2. The curved slot 3a traverses the groove 2a to discharge one of the screws S off the chute 2 onto the carrier arm 23, whereupon the discharged screw S is received by the pusher block 25.

Upon advancing movement of the slide 49, the resilient force of the spring 46 is reduced allowing the rod 45 to move to the left under the resiliency of the spring 44, thus opening the screw head guides 41 laterally away from each other. At the same time, the suction pipe 47 moves forward to draw a screw S from the catcher 37 into the suction pipe 47 under a vacuum developed therein. Continued advance of the suction pipe 47 with the screw S introduced therein pushes the catcher 37 down against the force of the spring 38 as shown in FIG. 4. The suction pipe 47 is moved forward until the front end thereof abuts against a workpiece W, whereupon the screwdriver bit 51 is actuated to drive the screw S into the workpiece S.

Figure 6:
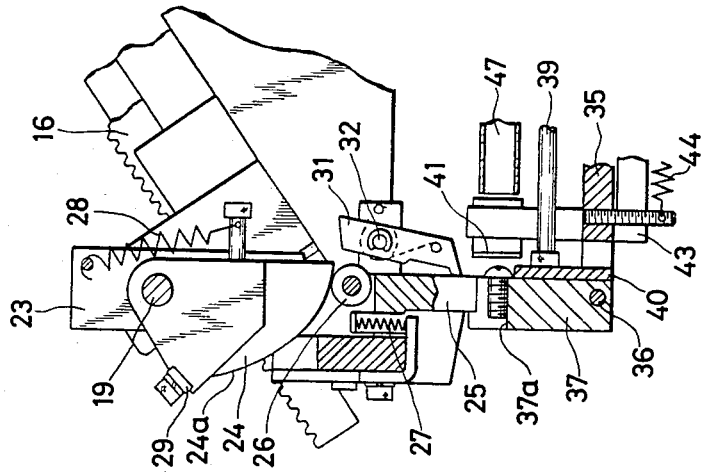

When the screw tightening is over, a signal is generated to retract the screwdriver bit unit 6 to the right as shown in FIG. 1. As the screwdriver bit unit 6 reaches its rearmost position, the valve 56 is actuated to enable the single acting cylinder 14 to extend its piston rod 14a. The shaft 19 is then turned to start angularly moving the carrier arm 23 and the plate cam 24 clockwise as shown in FIG. 7, allowing the screw holder 31 to hold the screw S down against the pusher block 25 under the resiliency of the torsion spring 34. The carrier arm 23 is stopped in its angular movement by the stop 58 at the lower position shown in FIG. 5, in which the carrier arm 23 is held in vertical alignment with the catcher 37. Continued advancing movement of the rack 16 causes the cam plate 24 to turn clockwise through an additional angle against the bias of the tension spring 28, enabling the cam surface 24a to depress the roller cam follower 26 and hence the pusher block 25 against the force of the spring 27 until the screw S is transferred from the latter into the recess 37a in the catcher 37 as illustrated in FIG. 6. When the connector 15 abuts against the stopper 17, the plate cam 24 stops moving angularly. Thus, one cycle of operation of the screwdriver is completed. The foregoing cycle of operation will be repeated to drive screws S successively into the workpiece W.

Figure 10:
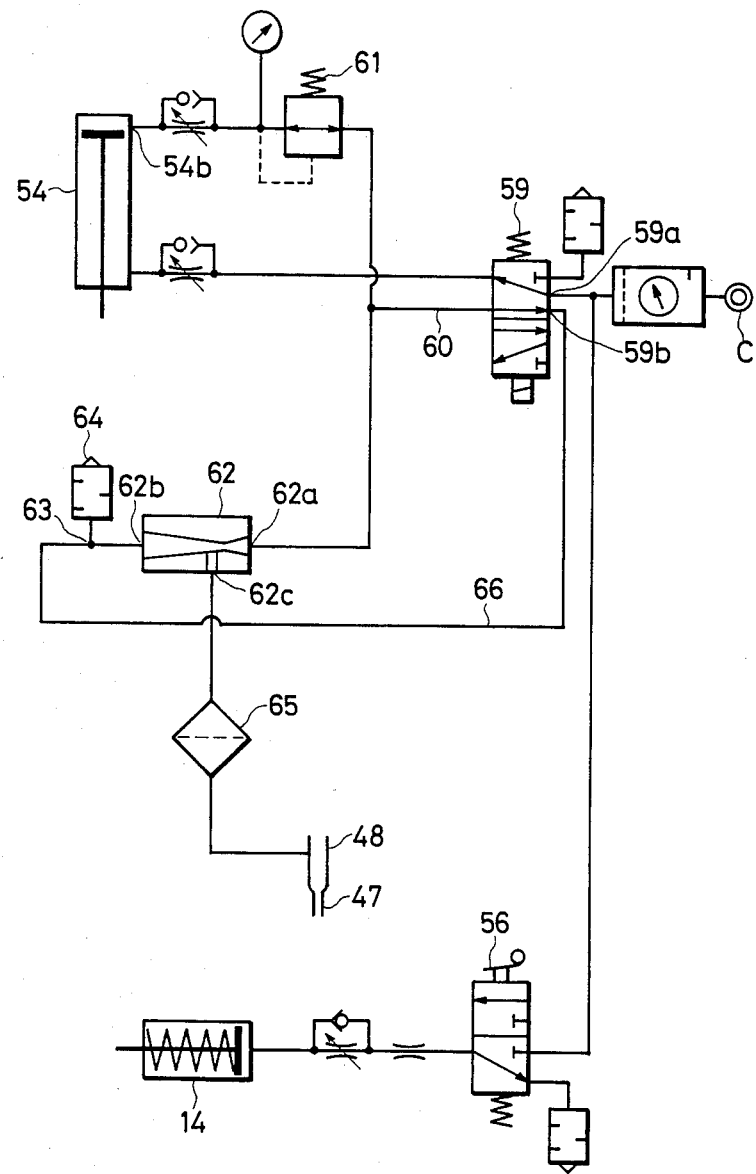
FIG. 10 is a circuit diagram of a pneumatic control system for the automatic screwdriver of the present invention.

The gate 3, the index mechanism 4, and the screwdriver bit unit 6 are actuated under the control of a pneumatic control system as illustrated in FIG. 10. The pneumatic control system includes a solenoid-operated directional control valve 59 for controlling the direction of flow of pressurized air from a source of compressed air C such as an air compressor to the air cylinder 54. When the solenoid-operated valve 59 is actuated to cause air to flow via a pipe 60 and a regulator 61 into a cylinder port 54b, the piston rod 54a of the cylinder 54 starts extending. The regulator 61 serves to adjust a pneumatic pressure applied on the screwdriver bit 51 from the air cylinder 54. Pressurized air from the source C is also supplied via the valve 59 into a supply port 62a of a vacuum-generating device 62 of the ejector-type or the venture-type. Air under pressure is fed through an exhaust port 62b and a Tee 63, and discharged from a muffler 64 into the atmosphere. With air thus discharged through the device 62, a vacuum is developed in a suction port 62 of the device 62 to draw air through a filter 65, the vacuum pipe 48 and the suction pipe 47 for introducing a screw into the suction pipe 47. Then, the screw is driven into the workpiece.

When the solenoid-operated valve 59 is de-energized, air under pressure in the air cylinder 54 is delivered from the port 54a via the regulator 61, the pipe 60, a pipe 66, the tee 63, the exhaust port 62b, the suction port 62c, the filter 65, the vacuum pipe 48 and the suction pipe 47 into the atmosphere. The air flow thus discharged out of the suction pipe 47 serves to eject any screw which may have remained in the suction pipe 47 due to unsuccessful screw-tightening operation, to force out of the suction pipe 47 any dust or debris which tends to be trapped in the suction pipe 47 where self-tapping screws are tightened by the screwdriver, and to clean the vacuum-generating device 62 and the filter 65 of dust or any foreign matter. The tee 63 is connected such that the exhaust port 62b and the pipe 66 are aligned with each other and the muffler 64 is coupled to a branch of the tee which extends normally to the line along which the exhaust port 62b and the pipe 66 are in alignment. With this arrangement, air flowing from the pipe 66 is prevented from going into the muffler 64 and is instead allowed to flow into the exhaust port 62b.

The solenoid-operated valve 59 should be preferably of a construction such that its spool is sealed only at its both ends. With this arrangement, inlet and outlet ports 59a, 59b of the valve 59 can communicate with each other when the valve spool is on its stroke to change the direction of flow of air, thereby allowing additional air to be fed into the pipe 66 for cleaning the device 62, the filter 65, and the suction pipe 47.

The pusher block 25 on the carrier arm 23 is effective to transfer screws with shorter shanks into the recess 37a in the catcher 37 since without the pusher block 25 such screws would become unstable in attitude while being transferred into the recess 37a.

Screws with longer shanks can drop into the recess 37a due to gravity when the screw holder 31 is lifted away from the pusher block 25, without lowering the pusher block 25. Such lifting of the screw holder 31 can be effected by providing the plate cam 24 at its front end with a projection for depressing the rear end of the screw holder 31, or providing a stopper which can engage the front end of the screw holder 31 when the carrier arm 23 abuts against the stop 58.

The screw head guides 41, 41 serve to stabilize screws having shorter shanks while the screws are being fed from the pusher block 25 into the recess 37a in the catcher 37. Without the screw head guides 41, 41, screws having sufficient shank lengths could be supplied into the recess 37a without any tendency to get reversed or turned the other way around. Although in the illustrated embodiment the carrier arm and the screw holder 31 jointly hold the head of a screw, an arrangement may be made to grip the shank of the screw below the head when the screw is carried on the carrier arm. Furthermore, the pusher block 25 may be arranged such that it pushes screws at their heads or shanks below the heads.

While a certain preferred embodiment of the present invention has been shown and described in detail, it should be understood that various changes or modifications may be made therein without departing from the scope of the appended claims.

What is claimed is:

1. An automatic screwdriver for driving a screw into a workpiece, comprising:
   a frame;
   a chute mounted on said frame for supporting a plurality of screws arranged in a row in the chute, said screws having shanks directed generally parallel to each other in a first direction;
   a gate mounted on said frame at one end of said chute and being selectively openable to allow the screws to be discharged one at a time out of said chute;
   an index mechanism mounted on said frame and having a carrier arm angularly movable between a first position in which said carrier arm receives a screw discharged by said gate and a second position in which said screw is oriented in a second direction different from said first direction;

a catcher unit mounted on said frame at said second position to receive the screw supplied from said index mechanism;

a screwdriver bit unit mounted on said frame and having an axially movable suction pipe for drawing the screw from said catcher unit into the pipe and towards a screwdriver bit rotatably disposed in said suction pipe for axial movement therewith to advance the screw past said catcher unit;

means for actuating the gate; and means for actuating said screwdriver bit unit, wherein said chute has a groove extending therealong to receive the shanks of said screws, said gate including an escape slide having a curved slot, the escape slide being slidable transversely of said chute for allowing one of the screws at a time to move along said groove and said curved slot past said gate and wherein said escape slide has a roller cam follower, said gate and index mechanism actuating means having a cam surface engageable with said roller cam follower for moving said escape slide to open said gate in response to movement of said carrier arm to said first position.

2. An automatic screwdriver for driving a screw into a workpiece, comprising:

a frame;

a chute mounted on said frame for supporting a plurality of screws arranged in a row in the chute, said screws having shanks directed generally parallel to each other in a first direction;

a gate mounted on said frame at one end of said chute and being selectively openable to allow the screws to be discharged one at a time out of said chute;

an index mechanism mounted on said frame and having a carrier arm angularly movable between a first position in which said carrier arm receives a screw discharged by said gate and a second position in which said screw is oriented in a second direction different from said first direction;

a catcher unit mounted on said frame at said second position to receive the screw supplied from said index mechanism;

a screwdriver bit unit mounted on said frame and having an axially movable suction pipe for drawing the screw from said catcher unit into the pipe and towards a screwdriver bit rotatably disposed in said suction pipe for axial movement therewith to advance the screw past said catcher unit;

means for actuating the gate; and means for actuating said screwdriver bit unit, wherein said index mechanism comprises a pair of support brackets mounted on said frame, a shaft rotatably supported on said support brackets, said carrier arm being rotatably supported on said shaft between said support brackets, a pusher block movably mounted on said carrier arm for carrying thereon the screw supplied from said chute, said pusher block having a roller cam follower, a screw holder mounted on said carrier arm for releasably retaining the screw on said pusher block, and a plate cam fixed to said shaft and operatively connected to said carrier arm, said gate and index actuating means including a pinion attached to said shaft for corotation therewith and a rack held in driving mesh with said pinion and movable to cause the plate cam to displace the roller cam follower until the screw is transferred from said pusher block onto said catcher unit past said screw holder when said carrier arm is in said second position.

3. An automatic screwdriver according to claim 2, wherein said index mechanism further comprises a first spring normally urging said pusher block in a direction to press said roller cam follower against said plate cam, a second spring normally urging said screw holder toward said pusher block to resiliently hold the screw against said pusher block, and a third spring normally urging said carrier arm to coact with said plate cam.

4. An automatic screwdriver according to claim 2, including a first stop mounted on said frame for stopping said carrier arm in its angular movement at said first position, a second stop mounted on said frame for stopping said carrier arm in its angular movement at said second position, and a holder lifter mounted on said frame for lifting said screw holder away from said pusher block to permit a next in line screw to be fed from said chute onto said pusher block.

5. An automatic screwdriver according to claim 2, wherein said plate cam has an arcuate cam surface held in engagement with said roller cam follower for displacing said pusher block toward said catcher unit in response to angular movement of said cam plate when said carrier arm is in said second position.

6. An automatic screwdriver for driving a screw into a workpiece, comprising:

a frame;

a chute mounted on said frame for supporting a plurality of screws arranged in a row in the chute, said screws having shanks directed generally parallel to each other in a first direction;

a gate mounted on said frame at one end of said chute and being selectively openable to allow the screws to be discharged one at a time out of said chute;

an index mechanism mounted on said frame and having a carrier arm angularly movable between a first position in which said carrier arm receives a screw discharged by said gate and a second position in which said screw is oriented in a second direction different from aid first direction;

a catcher unit mounted on said frame at said second position to receive the screw suppiled from said index mechanism;

a screwdriver bit unit mounted on said frame and having an axially movable suction pipe for drawing the screw from said catcher unit into the pipe and towards a screwdriver bit rotatably disposed in said suction pipe for axial movement therewith to advance the screw past said catcher unit;

means for actuating the gate; and means for actuating said screwdriver bit unit, wherein said catcher unit comprises a base fixed to said frame, a catcher pivotally mounted on said base and having a recess for receiving the screw in alignment with said suction pipe, a spring normally urging said catcher to a position in which said catcher recess receives the screw therein, said catcher being pivotally movable out of a path of axial movement of said suction pipe against the resiliency of said spring in response to axial movement of said suction pipe towards the workpiece.

7. An automatic screwdriver according to claim 6, including a pair of screw head guides pivotably mounted on said base and positionable between said catcher and said suction pipe for guiding the head od the screw into said recess, and means for separating said screw head guides from each other out of said path in response to axial movement of said suction pipe toward the workpiece.

8. An automatic screwdriver for driving a screw into a workpiece, comprising:
   a frame;
   a chute mounted on said frame for supporting a plurality of screws arranged in a row in the chute, said screws having shanks directed generally parallel to each other in a first direction;
   a gate mounted on said frame at one end of said chute and being selectively openable to allow the screws to be discharged one at a time out of said chute;
   an index mechanism mounted on said frame and having a carrier arm angularly movable between a frist position in which said carrier arm receives a screw discharged by said gate and a second position in which said screw is oriented in a second direction different from said first direction;
   a catcher unit mounted on said frame at said second position to receive the screw supplied from said index mechanism;
   a screwdriver bit unit mounted on said frame and having an axially movable suction pipe for drawing the screw from said catcher unit into the pipe and towards a screwdriver bit rotatably disposed in said suction pipe for axial movement therewith to advance the screw past said catcher unit;
   means for actuating the gate; and
   means for actuating said screwdriver bit unit, wherein gate and index mechanism actuating means comprises a pinion to which said carrier arm is operatively connected, a rack held in driving mesh with said pinion, said gate being actuatable by said rack, said gate and index mechanism actuating means being pneumatically coupled to the screwdriver bit unit actuating means having a source of pressurized fluid, a first directional control valve, a first fluid cylinder coupled through said first directional control valve to said source of pressurized fluid and having a piston rod connected to said suction pipe, a second directional control valve, a second fluid cylinder coupled through said second directional control valve to said source of pressurized fluid and having a piston rod connected to said rack, a vacuum-generating device connected via said first directional control valve to said source for generating a vacuum in said suction pipe to draw the screw therein, and an actuator for driving said screwdriver bit.

9. An automatic screwdriver according to claim 8, wherein said first directional control valve comprises a solenoid valve, said second fluid cylinder comprising a single acting cylinder, said second directional control valve being actuatable in response to operation of said first fluid cylinder.

* * * * *